Patented Nov. 29, 1932

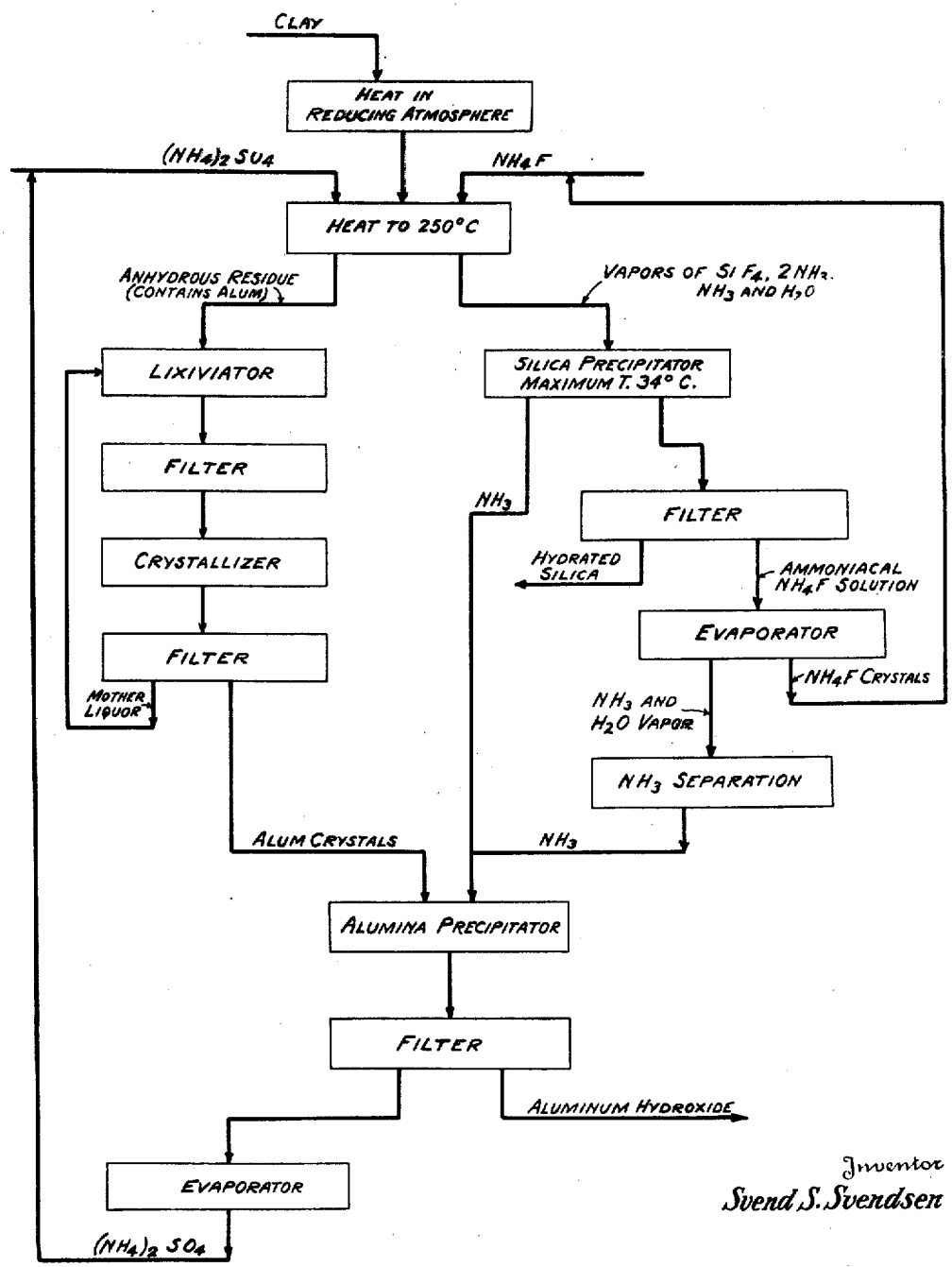

1,889,080

UNITED STATES PATENT OFFICE

SVEND S. SVENDSEN, OF CHICAGO, ILLINOIS, ASSIGNOR TO CLAY REDUCTION CORPORATION, A CORPORATION OF ILLINOIS

PRODUCTION OF ALUMINUM HYDROXIDE

Application filed September 7, 1928. Serial No. 304,617.

This invention relates to the production of aluminum hydroxide. It is illustrated in the accompanying drawing, in which a flow sheet showing the procedure in connection with a specific example of the invention is presented.

In my prior applications, Serial No. 191,267, filed May 13, 1927 and Serial No. 242,291, filed December 23, 1927, I have described and claimed processes in which minerals containing silica and alumina, with or without other metallic compounds are treated with ammonium fluoride and the mixture heated to produce and volatilize ammonia silican fluorine compounds, leaving a residue of metallic fluorides capable of being worked up for valuable products. The ammonia silicon fluorine compounds are decomposed by treatment with water and ammonia at temperature below 34° C. giving hydrated silica and ammonium fluoride. This ammonium fluoride is recovered and reused in the process.

In accordance with the present invention minerals containing alumina and silica, with or without alkali metal oxides, are heated with ammonium fluoride or bifluoride or substances which yield the same under the conditions of the reaction, and all or a substantial part of the silica is thereby volatilized. The alumina and alkali metal compound, if any alkali metals be present, are converted, either directly or indirectly, into sulfates by the action of reactive sulfates.

By the term "reactive sulfates" I intend to designate sulfuric acid, bisulfates, particularly bisulfates of ammonium and alkali metals, ammonium sulfate and other sulfates which, under the conditions of the reaction part with the sulfate radicals necessary for the production of the metallic sulfates.

Where sulfuric acid is employed as the reactive sulfate, it is preferred to treat the minerals first with ammonium fluoride and effect the sulfation in a subsequent operation. Where other reactive sulfates are used, they are preferably added to the minerals under treatment in the first instance.

The ammonium fluoride may be supplied in the dry state or in solution or in the form of vapor. On heating to about 200° C. to 330° C. the ammonium fluoride reacts with the minerals, the principal reaction being the production of silicon diammino tetrafluoride, $SiF_4(NH_3)_2$, which volatilizes at such temperatures and condenses to a light, fluffy sublimate, stable in the presence of ammonia or water vapor. Water and ammonia are also liberated and collected. The silicon fluoride ammonia is treated with water giving at temperatures below about 34° C. ammonium silico-fluoride, ammonium fluoride and hydrated silica. In the presence of ammonia the dissolved ammonium silicofluoride at temperatures below about 34° C. is quantitatively converted into further hydrated silica and ammonum fluoride. The ammonium fluoride is recovered and reused in the process.

Instead of using ammonium fluoride I may add to the reaction mixture substances which react to produce ammonium fluoride, for example, fluorspar and ammonium sulfate. I prefer to replace mechanical loss of ammonium fluoride in this manner.

The decomposition of the silicates proceeds satisfactorily with less fluoride than is necessary to combine with all the silica. However, in this manner of operation, flocculent silica is produced which hampers the filtration of the lixiviated residue. I, therefore, prefer to employ an amount of fluoride approximately equivalent to the content of the combined silica. It is to be noted that quartz is substantially unaffected and may be disregarded in the calculation of quantities.

The reaction temperature should be maintained below 335° C. to avoid losses of ammonia and sulfuric acid due to the production of nitrogen and sulfur dioxide. The reaction mixture is thereby maintained in dry state, i. e., in a condition not permitting the presence of liquid water. The reaction with some clays occurs at a temperature below 250° C. In the treatment of other clays much higher temperatures are necessary The temperature varies, however, to some extent with the nature of the mineral treated. By operating under a slight vacuum, for example, a few inches of mercury, the rate of the reaction is enhanced.

Where the mineral treated contains iron, it is preferably reduced to the ferrous state to avoid the production of ferric alum and also to prevent loss of ammonia during the reaction. This reduction may suitably be effected by passing a reducing gas such as carbon monoxide, hydrogen or gases containing them through the finely divided mineral at temperatures of the order of 400° C. In many cases there is sufficient organic matter in the mineral so that the reduction can be effected by mere heating in an inert atmosphere, such as of steam. Where iron is present, it is preferred to avoid any excess of sulfate or to use somewhat less than theoretically required to convert the alumina and alkali metal compounds into sulfates. In this way most of the iron in the residue is in the form of insoluble compounds.

The aluminum sulfate or alums which are extracted from the residue and crystallized may be converted into pure aluminum hydroxide in any suitable manner. I prefer however to effect this conversion by exposing the crystals of these substances to an atmosphere of ammonia. The ammonia dissolves in the water of crystallization, permeates the crystals and decomposes the aluminum sulfate with the production of aluminum hydroxide and ammonium sulfate. The crystals retain their form. The conversion may be expedited by increasing the pressure of the ammonia gas and cooling the charge. The reaction proceeds satisfactorily at atmospheric pressure but super-atmospheric pressures may be employed if desired. Since the reaction is exothermic the charge should be cooled to get rapid conversion.

The ammonium sulfate formed in this conversion is dissolved in water and the aluminum hydroxide separated by filtering. The filtrate contains ammonium sulfate with or without alkali metal sulfates which may be recovered and reused in the process.

The invention will be more completely understood from the following specific examples:

Example I

Pulverized bauxite, in which the ferric compounds have been reduced to ferrous as described above, is mixed with ammonium fluoride sufficient to convert the silica content into silicon diammino tetrafluoride ($SiF_4(NH_3)_2$) and with ammonium sulfate sufficient to convert the alumina content into ammonium aluminum sulfate and a little less than sufficient to convert other metallic oxides present into sulfates. The mixture is heated, while stirring, to between 230° C. and the temperature gradually increased to about 300° C. Ammonia, water vapor and silicon diammino tetrafluoride are evolved and collected. The silicon diammino tetrafluoride is converted into hydrated silica and ammonium fluoride by treating with ammonia water as described above. The hydrated silica is separated from the ammonium fluoride washed, and dried.

The ammonium fluoride solution is evaporated to crystallization and reused in the process. The condensed water from this evaporation is collected and used in the silica formation, as it contains ammonia.

The sulfate residue is lixiviated in boiling water; the solution is filtered from insolubles, principally calcium and iron salts, and ammonium alum is crystallized out by cooling. Iron salts, if present, may be eliminated by recrystallization.

The alum may be converted into aluminum hydroxide and ammonium sulfate by ammonia as described above. The ammonium sulfate may be reused after evaporation to crystallization as starting material for a further batch. When operating in this manner, the ammonium sulfate of the starting ingredients is substantially completely recovered. The only reagent consumed is the sulfuric acid necessary to convert the metals other than aluminum into sulfates, and this wastage is suitably replaced by introducing into the next charge an equivalent amount of ammonium sulfate together with the ammonium sulfate recovered. This additional ammonium sulfate may be prepared by neutralizing the surplus ammonia with sulfuric acid.

Example II

The following example is illustrated by the plan sheet presented in the accompanying drawing.

1000 lbs. of finely divided dry clay, containing about 30% alumina, 2% ferric oxide, 3% alkali metal oxides and 56% silica are heated in an atmosphere of steam or in other inert or reducing gas to a temperature of about 350 to 400° C. in order to reduce ferric compounds to ferrous.

The finely divided clay is then mixed with 1554 lbs. of ammonium sulfate, 24 lbs of sulfuric acid and 1370 lbs. of ammonium fluoride. Considerable heat is generated and ammonia and water vapors are evolved.

The mixture is further heated under constant stirring for 2–3 hours at about 250° C. The vapors evolved consisting principally of silicon diammino tetrafluoride, ammonia and water vapor are partially condensed whereby the silicon diammino tetrafluoride is separated from the ammonia and water vapor. Part of the ammonia is absorbed in water to be used for precipitation of silica and regeneration of ammonium fluoride from the silicon diammino tetrafluoride, while another part is retained in the gaseous state to be used in the conversion of aluminum sulfate into alumina.

The sulfate residue is lixiviated in 900 gallons of hot water and filtered hot to prevent crystallization of alum, and the residue is washed. The clear filtrate is cooled, alum crystallized out under constant stirring and dried in a centrifugal drier. The mother liquor about 570 gallons, together with wash water from lixiviation residue is used in lixiviation of new batches of sulfates. The alum crystals are converted into aluminum hydroxide and ammonium (and alkali) sulfate by action of ammonia gas, obtained from the first part of the process. As considerable heat is evolved, water cooling is advisable.

While the invention has been described in connection with the details of specific examples thereof, it must be understood that I do not intend such details to be limitative of the invention except in so far as included in the terms of the appended claims.

I claim:

1. The method of producing aluminum hydroxide which comprises treating material containing alumina and silica with ammonium fluoride in substantially dry state, removing the silicon by volatilization from the material in the form of ammonium silicon fluorine compounds, converting alumina of said material into aluminum sulfate and converting said aluminum sulfate compounds in the presence of residual fluoride compounds into aluminum hydroxide.

2. The method for producing aluminum hydroxide which comprises treating material containing alumina and silica with ammonium fluoride in substantially dry state, removing silicon from said material by volatilization in the form of ammonium silicon fluorine compounds, converting alumina in said material into ammonium alum in the presence of residual fluoride compounds, and converting said ammonium alum into aluminum hydroxide.

3. The method of producing aluminum hydroxide which comprises treating material containing alumina and silica with ammonum fluoride in substantially dry state, removing silicon from said material by volatilization in the form of silicon fluoride ammonia, reacting upon the alumina with ammonium sulfate to form ammonium alum in the presence of residual fluoride compounds, extracting ammonium alum from the residue, and reacting upon said alum with ammonia to form aluminum hydroxide.

4. The method of producing aluminum hydroxide which comprises treating material containing alumina and silica with ammonium fluoride in substantially dry state and removing the silicon of said material by volatilization in the form of ammonium silicon fluoride compounds, converting alumina of said material into aluminum sulfate compounds, crystallizing said sulfate compounds in the presence of residual fluoride compounds, treating said crystals with ammonia gas and separating the aluminum hydroxide from the soluble substances.

5. The method of producing pure aluminum hydroxide which comprises treating material containing alumina and silica with ammonium fluoride in substantially dry state, removing silicon by volatilization in the form of silicon fluoride ammonia, reacting upon the alumina in said material with ammonium sulfate in the presence of residual fluoride compounds to form ammonium alum, extracting and crystallizing said ammonium alum, treating said crystals with ammonia gas, and separating the aluminum hydroxide from the soluble substances.

6. The cyclic process for producing aluminum hydroxide and hydrated silica from material containing alumina and silica which comprises treating said material with ammonium fluoride and ammonium sulfate, removing the silicon by volatilization in the form of ammonium silicon fluorine compounds, reacting upon said compounds with ammonia formed in said reaction and water thereby forming hydrated silica and ammonium fluoride, collecting ammonia evolved, dissolving and extracting the resulting aluminum sulfate compounds from the reaction mass, crystallizing and reacting upon said compounds with the ammonia evolved and collected, separating the aluminum hydrate and ammonium sulfate formed thereby, and using the recovered ammonium fluoride and ammonium sulfate to react upon further quantities of material containing alumina and silica.

7. The method for forming aluminum hydroxide which comprises subjecting material containing alumina and silica to reduction to reduce ferric impurities to the ferrous state, heating said material with ammonium fluoride to form and volatilize the silicon as ammonium silicon fluorine compounds and treating the unvolatilized material with ammonium sulfate insufficient to convert the ferrous compounds into normal sulfates, lixiviating the residue and crystallizing ammonium alum therefrom, and reacting on said ammonium alum with ammonia to form aluminum hydroxide and ammonium sulfate.

8. In a cyclic method for producing aluminum hydroxide reacting on material containing alumina and silica with ammonium fluoride and a reactive sulfate and subsequently reacting on the aluminum sulfate compounds with ammonia, incorporating in the initial reaction mass additional fluorspar and ammonium sulfate and maintaining a reaction temperature suitable for the reaction with the alumina and silica-containing material and not above 335° C., thereby securing substantially complete conversion of the fluorine content of the fluorspar and supplementing the proportion of $NH_4F$ present.

9. The method of producing aluminum hydroxide which comprises treating material containing alumina and silica with ammonium fluoride in substantially dry state, removing the silicon by volatilization from the material in the form of ammonium silicon fluorine compounds, decomposing said compounds to release ammonia therefrom, converting alumina from the residue of said treatment into aluminum sulfate compounds, and contacting ammonia derived from the decomposition of the ammonium silicon fluorine compounds, with said aluminum sulfate compounds to convert them into aluminum hydroxide.

10. The method of producing aluminum hydroxide which comprises treating material containing alumina and silica with ammonium fluoride in substantially dry state, removing silicon from said material by volatilization in the form of silicon fluoride ammonium compounds, decomposing said compounds with formation of ammonia, reacting upon the residue from said treatment with ammonium sulfate to form ammonium alum in the presence of residual fluoride compounds, and reacting upon said alum with ammonia derived from said decomposition to form aluminum hydroxide.

In testimony whereof I have hereunto set my hand this 30th day of August, 1928.

SVEND S. SVENDSEN.

CERTIFICATE OF CORRECTION.

Patent No. 1,889,080.   November 29, 1932.

SVEND S. SVENDSEN.

It is hereby certified that error appears in the printed specification of the above numbered patent requiring correction as follows: Page 1, line 57, for "fluoride ammonia" read "diammino tetrafluoride", and line 65, for "ammonum" read "ammonium"; page 2, line 100, for "plan" read "flow"; page 3, lines 43 and 44, claim 3, for "ammonum" read "ammonium"; and that the said Letters Patent should be read with these corrections therein that the same may conform to the record of the case in the Patent Office.

Signed and sealed this 21st day of February, A. D. 1933.

(Seal)

M. J. Moore,
Acting Commissioner of Paten nium fluoride in substantially dry state, removing the silicon by volatilization from the material in the form of ammonium silicon fluorine compounds, decomposing said compounds to release ammonia therefrom, converting alumina from the residue of said treatment into aluminum sulfate compounds, and contacting ammonia derived from the decomposition of the ammonium silicon fluorine compounds, with said aluminum sulfate compounds to convert them into aluminum hydroxide.

10. The method of producing aluminum hydroxide which comprises treating material containing alumina and silica with ammonium fluoride in substantially dry state, removing silicon from said material by volatilization in the form of silicon fluoride ammonium compounds, decomposing said compounds with formation of ammonia, reacting upon the residue from said treatment with ammonium sulfate to form ammonium alum in the presence of residual fluoride compounds, and reacting upon said alum with ammonia derived from said decomposition to form aluminum hydroxide.

In testimony whereof I have hereunto set my hand this 30th day of August, 1928.

SVEND S. SVENDSEN.

CERTIFICATE OF CORRECTION.

Patent No. 1,889,080.    November 29, 1932.

SVEND S. SVENDSEN.

It is hereby certified that error appears in the printed specification of the above numbered patent requiring correction as follows: Page 1, line 57, for "fluoride ammonia" read "diammino tetrafluoride", and line 65, for "ammonum" read "ammonium"; page 2, line 100, for "plan" read "flow"; page 3, lines 43 and 44, claim 3, for "ammonum" read "ammonium"; and that the said Letters Patent should be read with these corrections therein that the same may conform to the record of the case in the Patent Office.

Signed and sealed this 21st day of February, A. D. 1933.

(Seal)

M. J. Moore,
Acting Commissioner of Paten

CERTIFICATE OF CORRECTION.

Patent No. 1,889,080.             November 29, 1932.

SVEND S. SVENDSEN.

It is hereby certified that error appears in the printed specification of the above numbered patent requiring correction as follows: Page 1, line 57, for "fluoride ammonia" read "diammino tetrafluoride", and line 65, for "ammonum" read "ammonium"; page 2, line 100, for "plan" read "flow"; page 3, lines 43 and 44, claim 3, for "ammonum" read "ammonium"; and that the said Letters Patent should be read with these corrections therein that the same may conform to the record of the case in the Patent Office.

Signed and sealed this 21st day of February, A. D. 1933.

(Seal)                                                  M. J. Moore,
Acting Commissioner of Paten